US009970822B2

(12) United States Patent
Roshandel et al.

(10) Patent No.: US 9,970,822 B2
(45) Date of Patent: May 15, 2018

(54) TEMPERATURE MONITORING DEVICE FOR WORKFLOW MONITORING SYSTEM

(71) Applicant: PAR Technology Corporation, New Hartford, NY (US)

(72) Inventors: Rahi Roshandel, Clinton, NY (US); Brian Johnson, New Hartford, NY (US); William Denale, Clinton, NY (US); Bernard Baker, Herkimer, NY (US)

(73) Assignee: PAR TECHNOLOGY CORPORATION, New Hartford, NY (US)

( * ) Notice: Subject to any disclaimer, the term of this patent is extended or adjusted under 35 U.S.C. 154(b) by 365 days.

(21) Appl. No.: 14/593,698

(22) Filed: Jan. 9, 2015

(65) Prior Publication Data

US 2015/0124852 A1 May 7, 2015

Related U.S. Application Data

(63) Continuation-in-part of application No. 13/458,637, filed on Apr. 27, 2012, now Pat. No. 8,931,952.

(51) Int. Cl.
*G01J 5/00* (2006.01)
*G01K 1/00* (2006.01)
*G01J 5/02* (2006.01)

(52) U.S. Cl.
CPC .......... *G01J 5/0265* (2013.01); *G01J 5/0003* (2013.01); *G01J 5/025* (2013.01)

(58) Field of Classification Search
USPC ............. 374/121, 208; 340/870.17; 702/135
See application file for complete search history.

(56) References Cited

U.S. PATENT DOCUMENTS 6,394,359 B1 5/2002 Morgan
6,806,808 B1 10/2004 Watters
6,850,861 B1 2/2005 Faiola
(Continued)

FOREIGN PATENT DOCUMENTS

GB 2331581 5/1999

OTHER PUBLICATIONS

Supplementary European Search Report for Application EP13782152 dated Jul. 9, 2015.
(Continued)

*Primary Examiner* — Mirellys Jagan
(74) *Attorney, Agent, or Firm* — Bond Schoeneck & King, PLLC

(57) ABSTRACT

A host device and temperature monitoring device (TMD) integrated assembly that can automatically collect temperature data and interface with a workflow management system. The TMD is provided in a portable housing and incorporates one or more temperature sensors, such as a physical probe, infrared sensor, or RFID transceiver, along with an interface for communicating via a wired connection with a host device that has been programmed with temperature management tasks. The TMD may be used to automatically collect temperatures and provide the data to the host for monitoring and tracking as part of a comprehensive workflow management system that includes food safety monitoring and compliance programs.

10 Claims, 7 Drawing Sheets

SCAN
165.5°F °C
MAX
HOLD
RANGE
888.8
888.8
-Measure
-OK/Units
-Mode/Power
SureCheck

(56) References Cited

U.S. PATENT DOCUMENTS

| | | | | |
|---|---|---|---|---|
| 8,931,952 | B2 * | 1/2015 | Langdoc | G01J 5/0003 374/121 |
| 2001/0044588 | A1 | 11/2001 | Mault | |
| 2002/0077766 | A1 | 6/2002 | Mault | |
| 2003/0208333 | A1 | 11/2003 | Starling | |
| 2004/0243352 | A1 | 12/2004 | Morozumi | |
| 2005/0008061 | A1 | 1/2005 | Kaneko | |
| 2007/0144835 | A1 | 6/2007 | Zhang | |
| 2007/0285238 | A1 | 12/2007 | Batra | |
| 2008/0144697 | A1 | 6/2008 | Stewart | |
| 2008/0204246 | A1 | 8/2008 | Kates | |
| 2008/0262782 | A1 | 10/2008 | Pompei | |
| 2009/0309748 | A1 | 12/2009 | Elgort | |
| 2010/0100351 | A1 | 4/2010 | Kobayashi | |
| 2010/0130142 | A1 | 5/2010 | Schubert | |
| 2011/0077909 | A1 | 3/2011 | Gregory | |
| 2011/0115636 | A1 | 5/2011 | Zhang | |
| 2011/0207429 | A1 | 8/2011 | Maier | |
| 2012/0019398 | A1 | 1/2012 | Vogt | |
| 2012/0075092 | A1 | 3/2012 | Petite | |
| 2013/0057390 | A1 | 3/2013 | Watt | |
| 2013/0202009 | A1 | 8/2013 | Murugan | |
| 2013/0300574 | A1 | 11/2013 | Gillette | |
| 2014/0112367 | A1 | 4/2014 | Roth | |

OTHER PUBLICATIONS

International Search Report Form PCT/ISA/220, International Application No. PCT/US2013/036274, pp. 1-11, dated Sep. 16, 2013.

* cited by examiner

TEMPERATURE MONITORING DEVICE FOR WORKFLOW MONITORING SYSTEM

CROSS-REFERENCE TO RELATED APPLICATIONS

The present application is claims priority to U.S. non-provisional patent application Ser. No. 13/458,637 filed on Apr. 27, 2012 "Temperature Monitoring Device for Workflow Monitoring System, the entirety of which is hereby incorporated by reference.

BACKGROUND OF THE INVENTION

1. Field of the Invention

The present invention relates to temperature monitoring devices for checking the temperature of food items and, more particularly, to a temperature monitoring device for use in an integrated workflow monitoring system.

2. Description of the Related Art

Workflow monitoring systems are used to organize, effect, and monitor the performance of required tasks at a particular location or locations. For example, a restaurant workflow system organizes tasks such as the monitoring of food temperatures, tracks employee performance of the tasks, and provides management with information about the effective performance of tasks, such as alerting when required tasks are not performed properly. This is particularly important for food safety issues, such as achieving and maintaining proper food temperatures during cooking operations or the storage of raw and cooked food items. For example, Hazard Analysis & Critical Control Points (HACCP) inspection programs for retail and food service organizations are expensive and time-consuming. While some systems try to remedy the difficulties associated with implementing a HACCP program by using computer systems to track the relevant data and information, these systems require the manual collection and input of data into the system on a daily, if not hourly, basis.

As many large retail establishments, such as superstores, now offer food items, such as delicatessen meats, dairy items, prepared foods, and baked goods, there is an even greater need for an integrated workflow system that automatically incorporates and manages food safety monitoring tasks, such as the taking and tracking of food temperatures, in an automated and efficient manner along with other tasks pertinent to the operation of the establishment, such as checking on the cleanliness of bathrooms, tracking inventory, and performing standard opening and closing tasks at the establishment each day.

BRIEF SUMMARY OF THE INVENTION

It is therefore a principal object and advantage of the present invention to provide a system for automatically collecting food temperature data.

It is a further object and advantage of the present invention to provide a system for integrating food temperature information into an automated workflow environment.

In accordance with the foregoing objects and advantages, an embodiment of the present invention provides a temperature monitoring device that can automatically collect temperature data and interface with a workflow management system. The temperature monitoring device comprises a portable housing including one or more temperature sensors, such as a probe or an infrared sensor, along with a host interface for communicating with a host, such as a Bluetooth® protocol interface. The temperature monitoring device may also include a transceiver for performing radiofrequency identification (RFID) operations, including programming and interrogation of RFID tags. The temperature monitoring device further includes a user display for identifying, among other things, the particular temperature collection method being used and displaying the temperature being recorded.

The temperature monitoring device is preferably wirelessly tethered to a particular host, which includes software for interfacing with the temperature monitoring device. For example, the host may comprise a personal digital assistance (PDA) that is programmed with various task or checklists required by the workflow management system in use at the particular location, such as the scheduled recording of temperatures of food items in a display case. At the appropriate time, the user of the PDA can go to the appropriate display case, collect the requisite temperature using a temperature monitoring device that has been paired with the PDA, thus allowing the PDA to record the temperature. With the temperature monitoring device included RFID capabilities, the user may also automatically record the location of the temperature check or obtain temperature data from an RFID tag having temperature monitoring capabilities. The workflow management system can then track the temperatures obtained by the PDA via the temperature monitoring device, verify that collected temperatures are acceptable, or flag a dangerous condition.

In accordance with an alternative embodiment of the present invention, a temperature monitoring device can be directly coupled/physically combined to a host device (e.g., through a USB interface or any other interface now known or developed in the future), with each device having the same programming and/or functionality described above. In brief, this alternative embodiment provides a temperature monitoring device/host assembly. The temperature monitoring device is directly connected (wired connection) to the host, which can be a mobile or tablet device (e.g., PDA). The handheld multifunction combined device includes an integrated barcode scanner, temperature insertion probe, IR temperature reader and RFID tag reader, each of which are mode selectable from the PDA device.

BRIEF DESCRIPTION OF THE SEVERAL VIEWS OF THE DRAWING(S)

The present invention will be more fully understood and appreciated by reading the following Detailed Description in conjunction with the accompanying drawings, in which.

Figure 4:
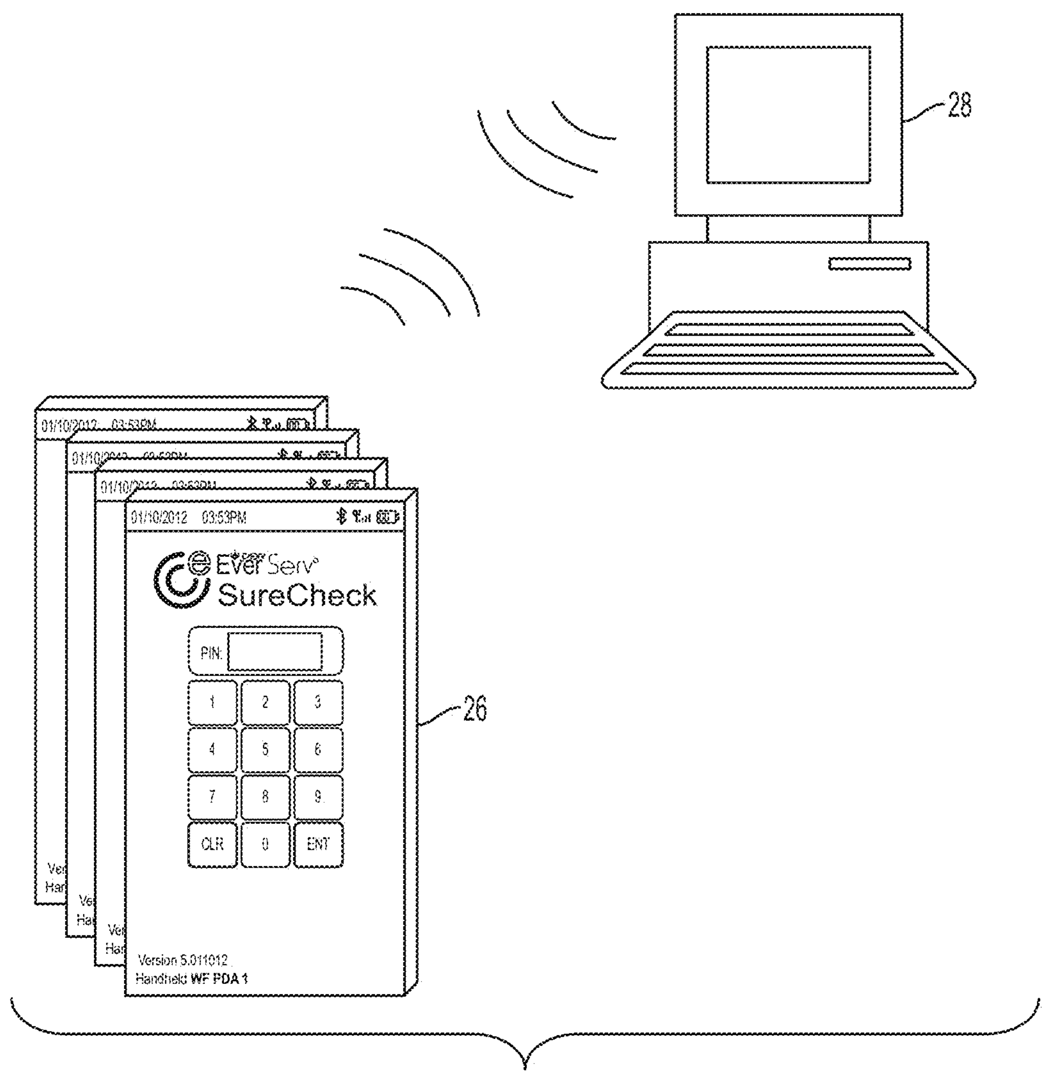
Figure 5:
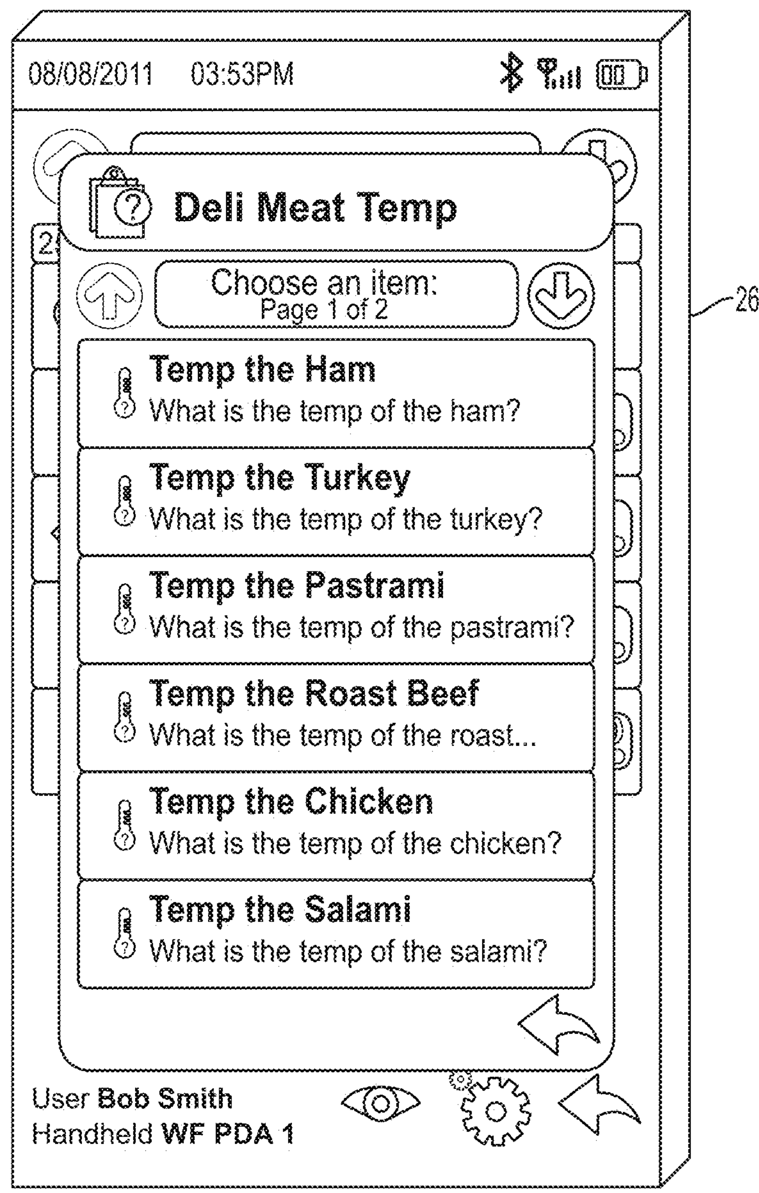
Figure 6:
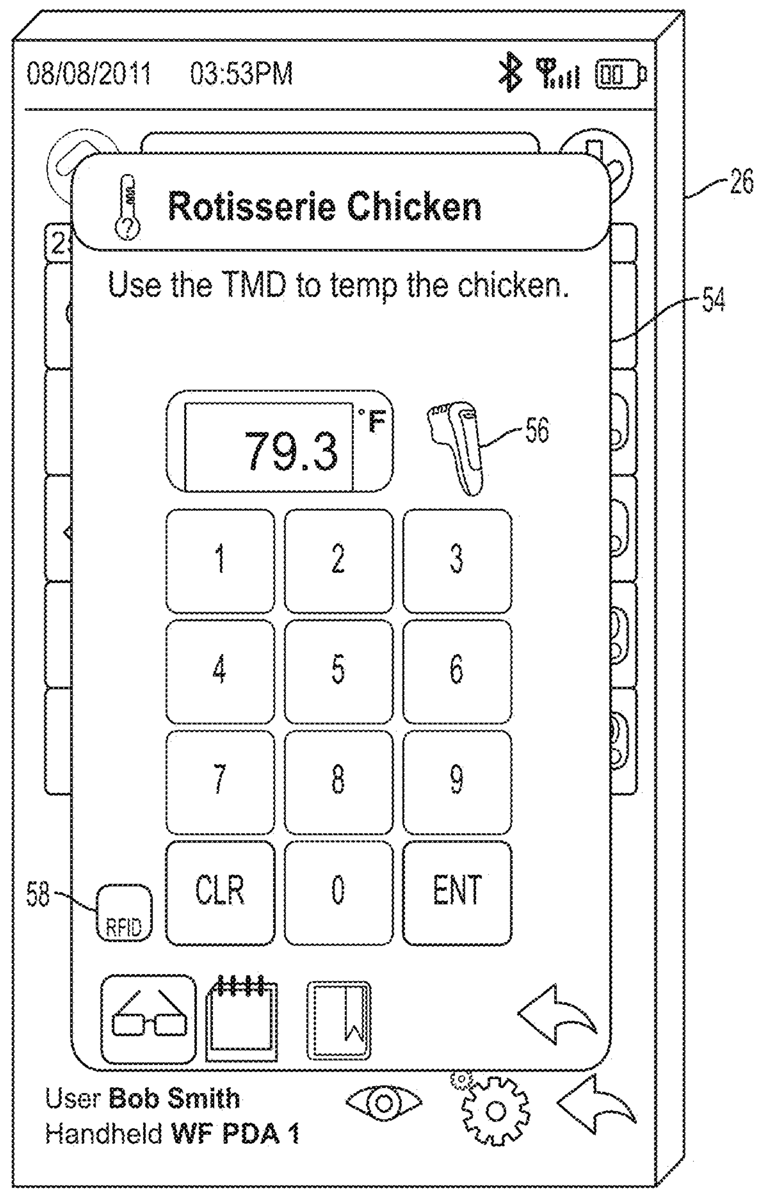

FIG. 4 is a schematic of a workflow management system for use with a temperature monitoring device according to the present invention FIG. 5 is an exemplary software display for a personal digital assistant hosting a temperature monitoring device according to the present invention; and FIG. 6 is another exemplary software display for a personal digital assistant hosting a temperature monitoring device according to the present invention.

Figures 7A, 7B:
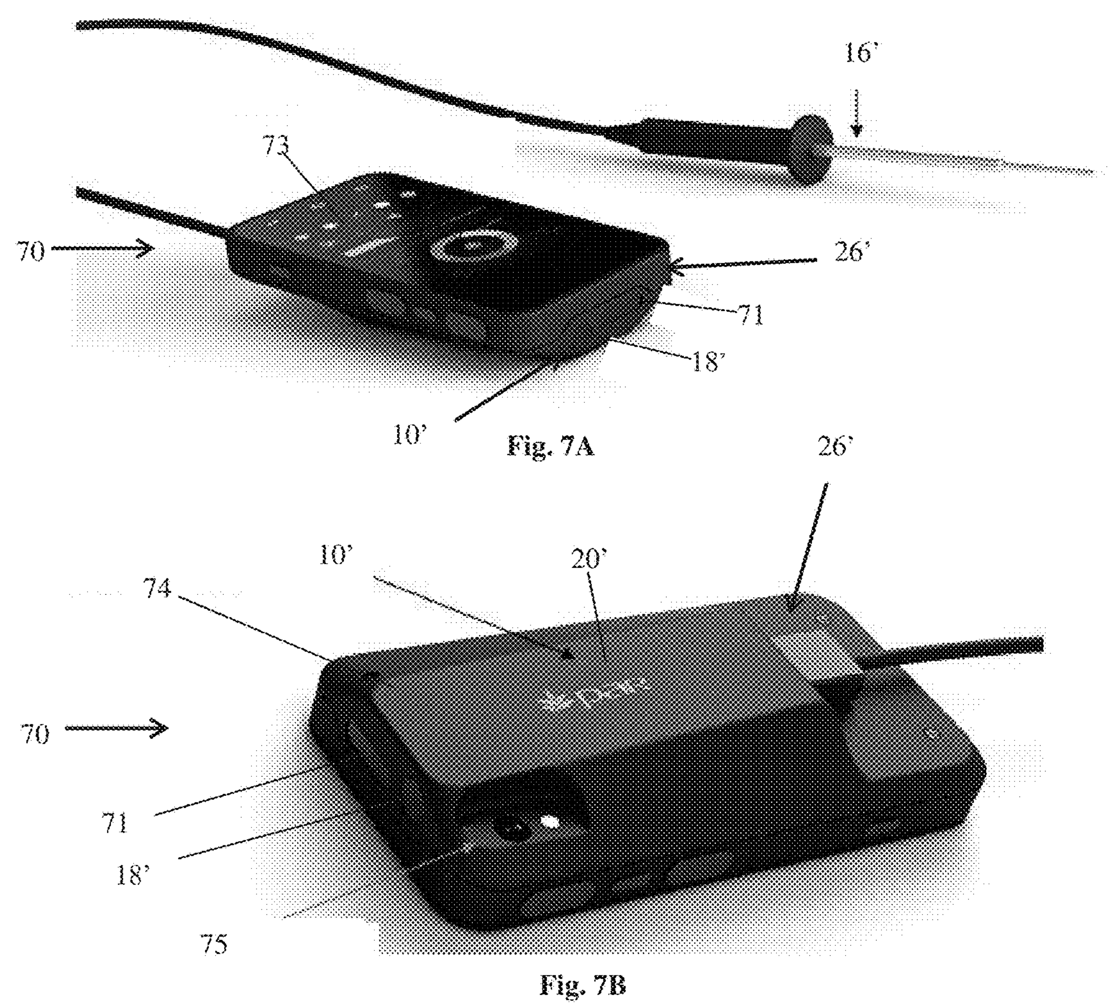

FIGS. 7A and 7B are perspective views of a temperature monitoring device/host assembly/integrated system, according to an alternative embodiment.

DETAILED DESCRIPTION OF THE INVENTION

Figure 1:
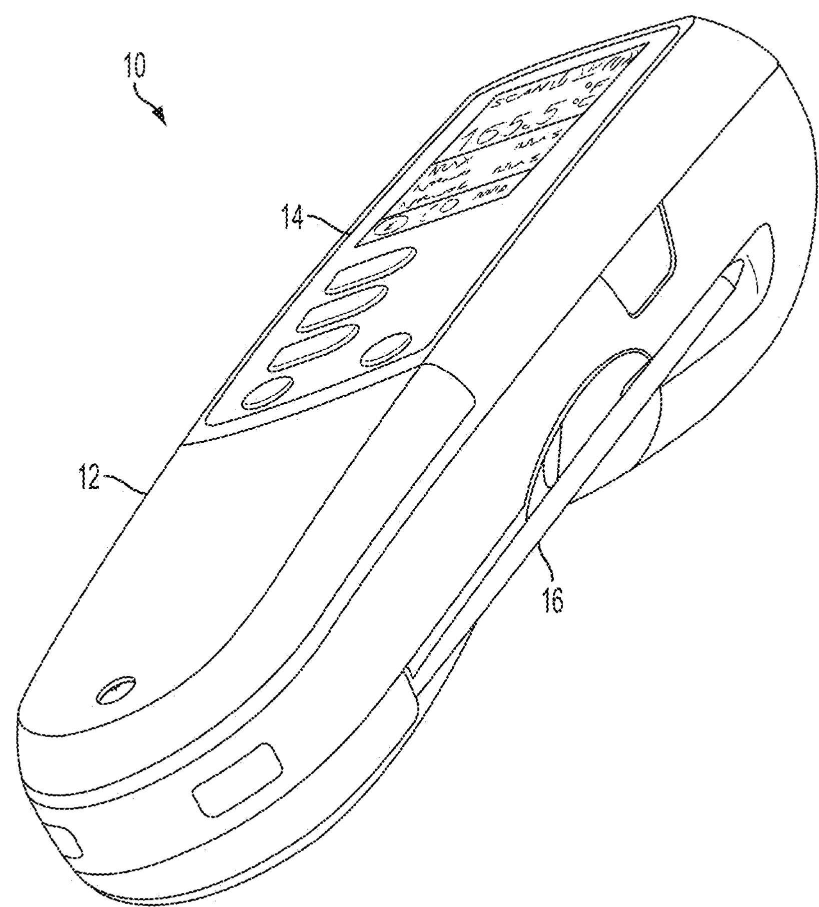
FIG. 1 is a perspective view of a temperature monitoring device according to the present invention.

Referring now to the drawings, wherein like reference numerals refer to like parts throughout, there is seen in FIG. 1 a temperature monitoring device 10 according to the present invention. Device 10 comprises a housing 12 having a user interface 14 for indicating the status of device 10 and allowing a user to manually interact with device 10. Housing is preferably formed from plastic and sealed to protect against the infiltration of moisture and other contaminants.

Figure 2:
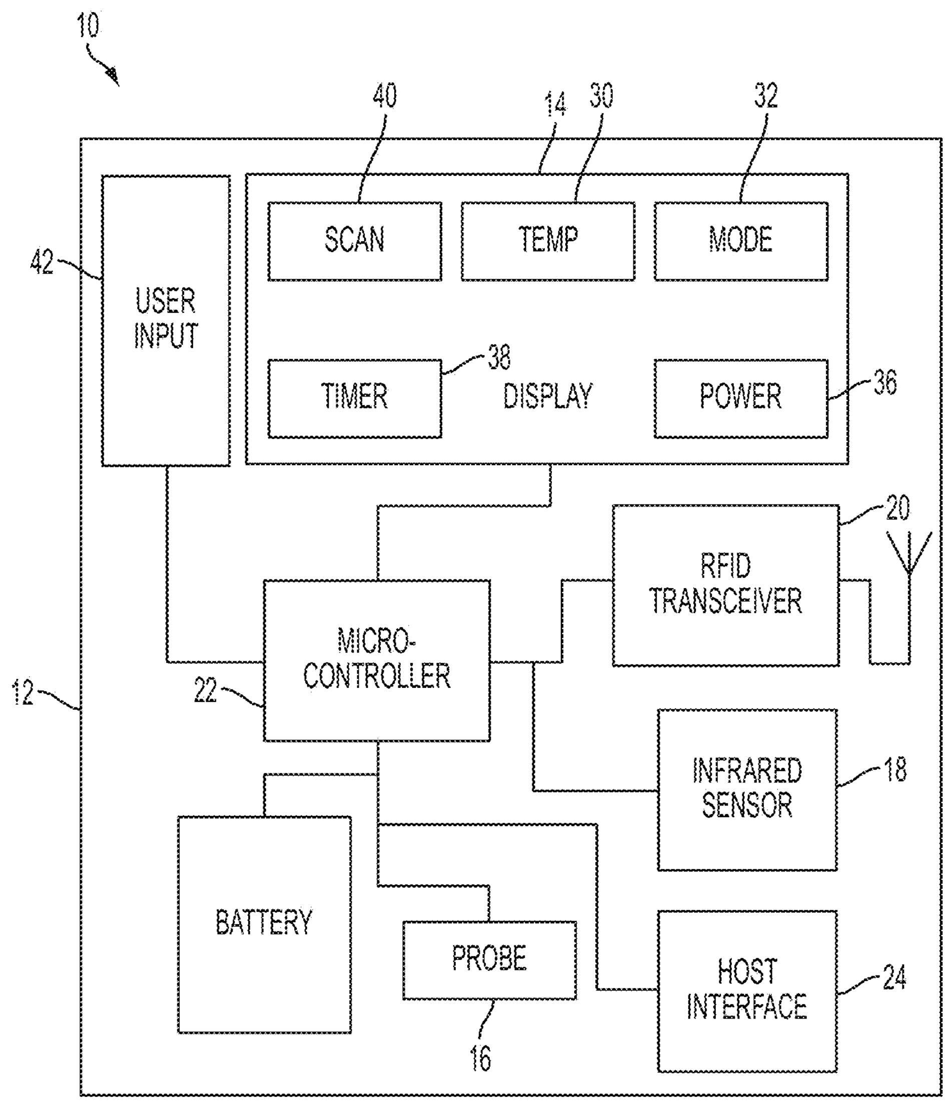
FIG. 2 is a diagram of the electrical components of a temperature monitoring device according to the present invention.

Device 10 preferably includes a temperature probe 16, such as a thermistor, a thermocouple, or a temperature-dependent resistor, interconnected to housing 12, for accurately determining the temperature of a target. Referring to FIG. 2, device 10 may additionally or alternatively include an infrared sensor 18 for determining the temperature of a target without the need for physical contact between device 10 and the target and an RFID transceiver 20 interconnected to microcontroller 22 for remote interrogation of RFID tags, including RFID tags that include temperature monitoring functionality, such as an Accuzone™ TurboTag™ RF smart card available from Sealed Air Corporation of Elmwood Park, N.J.

As further seen in FIG. 2, housing 12 includes a microcontroller 22 that is interconnected to display 14 as well as temperature probe 16 and infrared sensor 18. A wireless host interface 24, such as a Bluetooth® interface, is further interconnected to microcontroller 22 for wirelessly communicating with a host 26 that is remotely positioned from device 10, such as a personal digital assistant (PDA). Pairing of device 10 with host 26 may be accomplished through known processes such as those used with Bluetooth® devices. It should be recognized by those of skill in the art that device 10 can further comprise any number of conventional handheld electronic components, such as a rechargeable battery, a docking interface for connecting to an AC-powered docking station for recharging the battery or establishing a physical interface to host server, etc.

Figure 3:
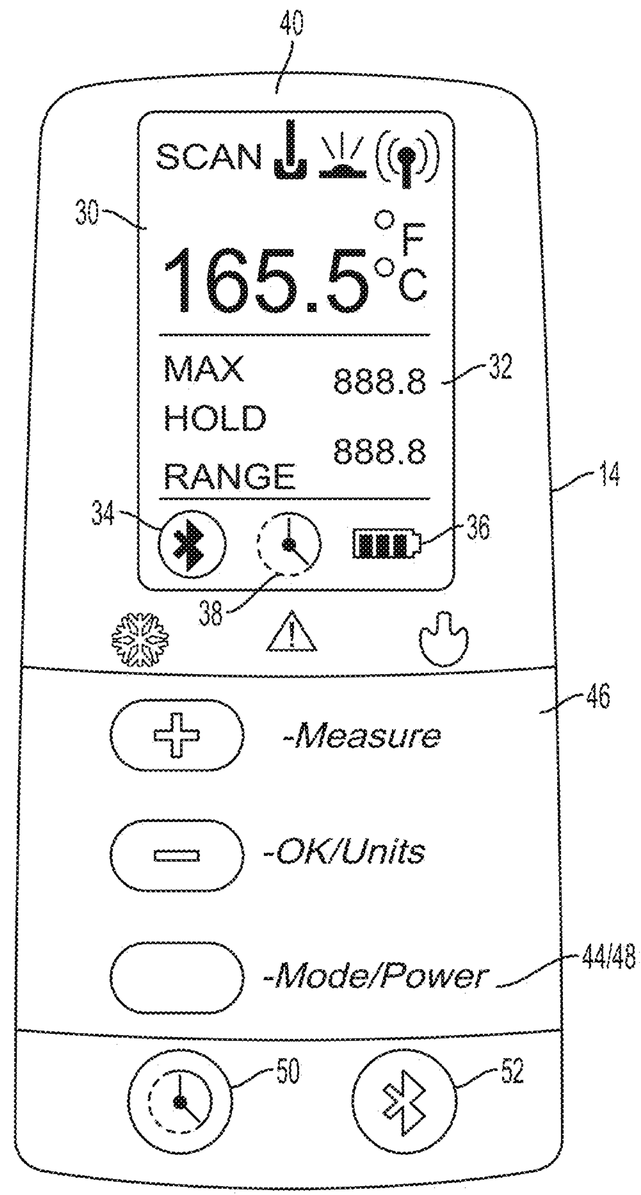
FIG. 3 is a schematic of the user interface for a temperature monitoring device according to the present invention.

Referring to FIG. 3, display 14 of device 10 can provide information about the status of device 10. For example, the temperature sensing mode, i.e., whether temperature measurement is being performed by probe 16, infrared sensor 18, or RFID transceiver 20, may be reflected on display 14 by predetermined icons representing each mode. Display 14 may also provide the current or final recorded temperature 30 as well as a range of acceptable temperatures 32, the status of the host interface 34, battery level 36, timer status 38, and scanning status 40. Display 14 may be accompanied by a user input 42 having one or more buttons for directing device 10 to select the collection mode 44, trigger a measurement 46 using the selected mode, turn the device on and off 48, start and stop a timer 50, and turn the host interface on and off 52. As described below, timer 50 may be used to set the parameters for determining a stable temperature, or simply to provide a stopwatch or countdown timer. The addition of a buzzer or vibration motor may also allow for various conditions, such as a successful temperature measurement or interrogation, low device power, or error condition, to be provided to the user via sound or vibration.

Referring to FIG. 4, host 24 is preferably a personal digital assistant (PDA) 26 that is interconnected to a workflow management server 28 typically located at a particular location. More particularly, PDA 26 is controlled by system 28 to display various location specific processes, tasks, checklists, etc. that the user of PDA 26 is required to manage, supervise and/or perform pursuant to predetermined protocols implemented on system 28. For example, as seen in FIG. 5, system 28 may direct PDA 26 to include a checklist, such as any number of delicatessen counter food items whose temperatures must be recorded on a daily basis. The user of PDA 26 may proceed at the designed times to the delicatessen counter and collect the requisite sample temperatures using temperature monitoring device 10 (after device 10 has been paired with PDA 26).

The present invention provides a device and method for automatically collecting these temperatures via probe 16, infrared sensor 18, or even wirelessly by interrogating an RFID tag with transceiver 20 then wirelessly providing the temperatures from temperature monitoring device 10 to PDA 26 via interface 24 to satisfy the particular task on PDA 26 that the user was required to perform by obtaining a temperature reading. PDA 26 or system 28 may then track or compare the collected temperature against predetermined standards and perform appropriate monitoring of recorded temperatures to ensure food freshness and safety.

To accomplish this interconnectivity with system 28, the present invention further comprises host functionality for interconnecting to device 10. As seen in FIG. 6, PDA 26 may include software designed to communicate with device 10 and import temperature data collected by device 10. For example, PDA 26 may be programmed to display a temperature collection screen 54 associated with a particular task, such as taking the temperature of rotisserie chicken in a store display. The user of PDA may then proceed to the rotisserie display and use temperature monitoring device 10 to collect the appropriate temperature and then wirelessly import that temperature into PDA 26. As further seen in FIG. 6, PDA 26 may include various indicia, such as a device icon 56 for indicating to the user that the temperature was obtained from a tethered temperature monitoring device 10, one or more RFID icons 58 to indicate that the location has an associated RFID tag and that is was confirmed or skipped, and even a keypad 58 allowing a user to clear or alter input information.

In addition to directing the taking of the temperature, system 28 may also dictate the particular temperature collecting mode that must be used by PDA 26 sending commands to device 10 that dictate which temperature collection method should or must be used. For example, system 28 may dictate to PDA 26 the use of infrared sensor 18 for a particular temperature monitoring task where it would be impractical or dangerous to use physical probe 16. PDA 26 may then, in turn, send a host command via interface 24 to microcontroller 22 of a temperature monitoring device 10 to switch into the mode that uses infrared sensor 18 and to prohibit the user from using a prohibited collecting mode.

To use device 10 to measure the temperature, the user can manually select the desired measurement mode using mode button 44 and then trigger a measurement scan with measure button 46 (unless measurement mode has been dictated by system 28 or PDA 26). Once measured, the current temperature will update on both interface 14 of device 10 and PDA 46. For temperature values that are obtained during an "automatic" measuring session and the resulting temperature is considered "stable," the value is transmitted to PDA 26 and would be validated by the PDA 26 immediately upon receipt and acted upon accordingly without the need for the user to interact with PDA 26. As such, PDA 26 can immediately present the green (good) or red (violation) feedback and any corresponding correct actions that should be taken according to predetermined protocols.

For measurements with probe 16 or infrared sensor 18, device 10 preferably collects sample temperatures and automatically holds the temperature value once it is stable. The current measurement value 30 is displayed for the user, along with maximum and minimum values 32 for all measurements thus far in the session. Generally, measurement of sample temperatures should continue until one of the following conditions occurs: a predetermined number of consecutive measurements, such as five, are within a given range each other, such as 0.5 degrees Fahrenheit; a user terminates measurement before a stable temperature is measured by pressing an appropriate button; or the session times out, such as when there are thirty seconds of measurements without a stable temperature. In the event of a stable temperature, the value is then sent to PDA 26. Preferably, device 10 is programmed to discontinue sampling at a given point, regardless of whether a stable temperature has been reached, to preserve battery life. It should be recognized by those of skill in the art that the sampling rate, temperature range defining a stable temperature, time range for determining a stable temperature, and overall timeout period may be selected depending on the particular application and needs of the user.

Device 10 may also be used to read various RFID tags with RFID transceiver 20. For example, device 10 may be used to read non-temperature RFID tags, such as those used to conform the location of a user at a given location. This type of RFID tag does not sense the current temperature and only reports a unique static identification. When interrogated by device 10, this tag will simply report its unique identifier and the tag data is not parsed for any temperature values. Device 10 may also read RFID temperature tags that sense the current temperature but do not store historical data. When requested by device 10, this type of RFID tag will send the current temperature value as a single data point along with the tag ID. Again, this tag is not parsed for a stable temperature reading and merely provides the most current reading as of the scanning time. Finally, device 10 may read RFID temperature tags that sense the current temperature and contain a predetermined number of historical data points stored in built-in memory. When requested by device 10, this tag will send all data points to device 10, including the tag ID. The historical data provided by this type of tag may be parsed by device 10 to obtain a stable temperature reading according to the parameters discussed above in addition to conveying the data to PDA 26. In any case, PDA 26 may be used to validate data obtained from RFID tags, flag any anomalous conditions, and to confirm that the appropriate RFID tag has been interrogated by device 10 as required by the particular system checklist item or process.

As described above, device 10 may be used in connection with PDA 26 and remote server 28 as an integral part of a workflow management system. For example, device 10 can be used to collect location information and any temperatures needed in a particular retail store, restaurant or other establishment that is required to monitor the temperature of target items, thereby allowing PDA 26 and/or server 28 to compare temperatures against predetermined standards or food safety criteria, to track and monitor temperatures over time to improve the safety of food related items, and to ensure that workplace employees are timely and accurately taking temperature measurements and completing other required tasks that are deemed necessary. This management can occur on a department, store, or even system wide basis, allowing supervision by all management levels.

Device 10 may also be used to automate non-temperature based task management collection and monitoring via RFID transceiver 20. For example, device 10 may be used to scan an RFID tag at a specific location to verify that the check on a checklist was done exactly where it was supposed to be even if that check did not require the collection of a temperature measurement via probe 16, infrared sensor 18, or RFID transceiver 20. As RFID tags are typically serialized the ability to read via device 10 allows provides for unique, confirmed identification for a given location that can be attached to a checklist for task-related validation. The checklist/check item data record created by using device 10 combines verified time, location, and observation (yes/no, good/bad, etc.) for each individual task being tracked.

For example, a grocery store can position an RFID tag on each aisle. Employees that a required to perform a sweep check, where the employee visually checks each aisle for cleanliness, on a periodic basis can scan the RFID tag of each to establish that each aisle was, in fact, checked at a particular time, thereby allowing server 26 to monitor staff performance and develop a record in the event of an accident to establish diligence in maintaining a safe location on behalf of the establishment. Similar, RFID tags can be located in guest bathrooms so that the employees responsible for cleaning can scan to show that the location was visited at the appropriate time. Device 10 may also be used in establishments such as hotels, to establish the timing associated with cleaning guest rooms, and hospitals can use RFID tags to monitor the cleaning of patient rooms. Retail stores may use device 10 with located RFID tags to monitor tasks, such as opening and closing routines, that require an employee to be present in a particular location at a particular time to perform a certain tasks. As yet another example, a factory supervisor that is responsible for checking in on each part of a factory line and ensuring the work is up to quality may use located RFID tags that are read by device 10 to establish that checklist tasks were performed on time and in the proper location. The performance and RFID location data established by the use of device 10 for any of these tasks can be easily monitoring by system 26 and collected into reporting and analytics to allow review by supervisors and management.

Turning to FIGS. 7A and 7B, a temperature monitoring device/host assembly/integrated system 70 is shown, in accordance with an alternative embodiment. The integrated system 70 includes, but is not limited to, a host 26' and a temperature monitoring device 10', which is directly connected to the host 26' and will receive data transfers and commands from the host over an internal USB port (not shown), for example, in this embodiment. The host 26' and temperature monitoring device 10' of this embodiment include all of the same programming, functionality, and capabilities as discussed above with respect to the other embodiments. A main difference between this alternative embodiment and the embodiment described above, is the direct connection between the host 26' and temperature monitoring device 10'. Further, all of the functionality with respect to the user interface 14 of the temperature monitoring device 10, as shown and described with respect to FIG. 3, are performed/have been replaced by the user interface 73 of the host 26' in this alternative embodiment.

The temperature monitoring device 10 includes a housing 74, which preferably fits on to the back of the host 26'. The temperature monitoring device 10' can include a temperature probe 16' (e.g., an antimicrobial type T thermocouple stainless steel insertion probe that can be fully integrated as shown or wireless), infrared sensor 18' (preferably non-contact with spotting LED), and an RFID transceiver 20' built into the temperature monitoring device 10' (as discussed above). Preferably, the RFID transceiver 20' chipset is designed into the host 26', and the NFC antenna is part of the temperature monitoring device 10'. The temperature monitoring device 10' can include a barcode scanner 71 (e.g., to read 1D and 2D barcodes). A camera 75 functionality is also contemplated.

The host 26' can provide power to the temperature monitoring device 10' via the USB connection/interface (pogo pins).

The temperature monitoring device/host assembly/integrated system 70 can be powered by a lithium ion rechargeable battery. The system 70 can interface to outside devices via any communication means. In particular, the transmission/transfer of data, control signals, communication signals and/or monitoring signals from various portions/components of embodiments of the system described herein can be via wireless communication/transmission over a network, which can be any suitable wired or wireless network capable of transmitting communication, including but not limited to a telephone network, Internet, Intranet, local area network, Ethernet, online communication, offline communications, wireless communications, satellite communications and/or similar communications means. The wireless transmission can be accomplished through any wireless protocol/technology, including, but not limited to, ZigBee standards-based protocol, Bluetooth technology, and/or Wi-Fi technology. Further, this data can be encrypted as needed based on the sensitivity of the data or the location the components of the system, for example. While several embodiments of the invention have been discussed, it will be appreciated by those skilled in the art that various modifications and variations of the present invention are possible. Such modifications do not depart from the spirit and scope of the present invention.

What is claimed is:

1. A system for managing the collection and monitoring of the temperatures of a plurality of targets, comprising:

an integrated assembly comprising a host device and a separate temperature monitoring device, the host device being a mobile device, coupled to the temperature monitoring device, said temperature monitoring device including a housing having a host interface adapted for wired communication with said host device, said housing removably attached to said host device, a microcontroller communicatively interconnected to the host interface and positioned within said housing, an infrared temperature sensor interconnected to said microcontroller, a radiofrequency identification transceiver interconnected to said microcontroller, and a temperature probe attached to said housing and interconnected to said microcontroller so that said microcontroller can selectively activate per inputs received from the host interface one or more of said sensor, transceiver and probe;

wherein said temperature probe is attached to said housing via an external cable which connects said temperature probe to said host interface via said microcontroller;

a remote server interconnected to said host device, wherein said server is programmed to provide said host device with at least one temperature monitoring task requiring a user of said integrated assembly to obtain a temperature of one of said plurality of targets per the use of at least one of said infrared temperature sensor, said radiofrequency identification transceiver and said temperature probe;

wherein said host device is programmed to require the use of said infrared temperature sensor when said at least one temperature monitoring task is from a first set of temperature monitoring tasks;

wherein said host device is programmed to require the use of said radiofrequency identification transceiver when said at least one temperature monitoring task is from a second set of temperature monitoring tasks; and wherein said host device is programmed to require the use of said temperature probe when said at least one temperature monitoring task is from a third set of temperature monitoring tasks.

2. The system of claim 1, wherein said host device is programmed to display said at least one temperature monitoring task for said user and allow said user to provide said temperature to said host device via said temperature monitoring device per said wired communication.

3. The system of claim 1, wherein said temperature monitoring device further comprises a barcode scanner.

4. The system of claim 3, wherein said host device is programmed to require the use of said barcode scanner when said at least one temperature monitoring task is from a fourth set of temperature monitoring tasks.

5. The system of claim 1, wherein said host device is programmed to send a command via said wired communication to said temperature monitoring device that enables: said infrared temperature sensor when said at least one temperature monitoring task is from the first set of temperature monitoring tasks; said radiofrequency identification transceiver when said at least one temperature monitoring task is from the second set of temperature monitoring tasks; and said temperature probe when said at least one temperature monitoring task is from the third set of temperature monitoring tasks.

6. The system of claim 5, wherein said microcontroller of said temperature monitoring device is programmed to collect temperature data using the enabled one of said sensor, transceiver and probe when triggered by user.

7. The system of claim 6, wherein said microcontroller of said temperature monitoring device is programmed to export said temperature data to said host device via said wired communication.

8. The system of claim 7, wherein said host device is programmed to validate said temperature data for compliance with predetermined requirements.

9. The system of claim 8, wherein said temperature monitoring device is programmed to obtain location data from a tag positioned at a predetermined location via said transceiver in addition to obtaining temperature data via one or more of said sensor and said probe.

10. The system of claim 9, wherein said host device is programmed to inhibit the use of one or more of said sensor, transceiver and probe based on said at least one task.

* * * * *